(12) United States Patent
Meunier et al.

(10) Patent No.: US 8,014,229 B2
(45) Date of Patent: Sep. 6, 2011

(54) METHOD FOR SEISMIC EXPLORATION

(75) Inventors: Julien Meunier, Paris (FR); Robert Soubaras, Orsay (FR)

(73) Assignee: Cggveritas Services SA, Massy (FR)

( * ) Notice: Subject to any disclaimer, the term of this patent is extended or adjusted under 35 U.S.C. 154(b) by 1035 days.

(21) Appl. No.: 11/659,994

(22) PCT Filed: Aug. 8, 2005

(86) PCT No.: PCT/IB2005/002717
§ 371 (c)(1),
(2), (4) Date: May 10, 2007

(87) PCT Pub. No.: WO2006/018728
PCT Pub. Date: Feb. 23, 2006

(65) Prior Publication Data
US 2007/0268781 A1    Nov. 22, 2007

(30) Foreign Application Priority Data
Aug. 12, 2004  (FR) ..................... 04 08838

(51) Int. Cl.
*G01V 1/00* (2006.01)
(52) U.S. Cl. ......................................... 367/38
(58) Field of Classification Search ............. 376/37, 376/38, 47
See application file for complete search history.

(56) References Cited

U.S. PATENT DOCUMENTS

| | | | | |
|---|---|---|---|---|
| 5,157,638 A | * | 10/1992 | Loumos et al. | 367/54 |
| 5,404,296 A | * | 4/1995 | Moorhead | 702/14 |
| 5,721,710 A | * | 2/1998 | Sallas et al. | 367/41 |
| 6,519,533 B1 | * | 2/2003 | Jeffryes | 702/17 |
| 6,906,981 B2 | * | 6/2005 | Vaage | 367/21 |
| 7,466,632 B1 | * | 12/2008 | Sorli | 367/153 |

FOREIGN PATENT DOCUMENTS

| | | |
|---|---|---|
| EP | 0 326 308 | 8/1989 |
| FR | 2 666 905 | 3/1992 |
| FR | 2 766 277 | 1/1999 |

* cited by examiner

*Primary Examiner* — Jack Keith
*Assistant Examiner* — Krystine Breier
(74) *Attorney, Agent, or Firm* — Potomac Patent Group PLLC

(57) ABSTRACT

The invention relates to a method for seismic exploration, comprising the steps of controlling a plurality of sources so that they emit a plurality of seismic waves in a subsurface zone to be explored, each source successively occupying a plurality of emitter positions, producing for each emission a signal representative of the emission, and recording the position of the source and the instant at which the emission starts, continuously recording by means of seismic sensors the composite signals reflected by the medium in response to said emissions, and carrying out shot point migration, on the one hand, from a reflected wave field constituted of said composite signals and respective sensor positions, and on the other hand, from an incident wave field constituted of signals representative of the emissions, source positions and start emission instants, so as to obtain a seismic image.

20 Claims, No Drawings

METHOD FOR SEISMIC EXPLORATION

CROSS-REFERENCE TO RELATED APPLICATION

This national phase application is based on PCT/IB2005/002717 filed on Aug. 8, 2005 which claims priority to French Application No. 0408838 filed Aug. 12, 2004 entitled "Method for Seismic Exploration".

The present invention relates to the seismic exploration of the subsurface.

In order to build up images of the subsurface, geologists or geophysicists usually use seismic wave sources placed, for example on the surface. These sources create vibrations at ground level which then propagate in the subsurface in the form of waves and are reflected, by the interfaces between geological strata (reflectors). The waves reflected towards the surface are recorded as a function of time, by seismic sensors, geophones for land surveys or hydrophones for marine surveys.

The cost of seismic studies is basically related to the time needed for carrying out the series of measurements. To reduce this time, certain acquisition techniques make it possible to take measurements by activating several sources simultaneously or at regular time intervals, such that the emitted signals overlap in time.

Document FR 2 766 277-A1 (published Jan. 22, 1999) describes in particular a method for acquiring seismic data in which sources emit signals simultaneously. This method uses explosives as short signal emitter sources. Geophones detect a signal including several components arriving from different sources. The whole of the acquisition system including the sources and geophones is displaced before each shot by a predetermined distance. Using this method, the obtained measurements, constituted of a collection of traces, are corrected statically and dynamically, the applied correction only taking into account one of the sources whereas the reflections caused by the other sources are not taken into account. Corrections are thus applied individually for each source, making it possible to separate the signals emitted by the different sources.

Other acquisition techniques exist, using vibroseismic sources emitting long signals overlapping in time.

According to one of these acquisition techniques (called slip-sweep), the sources are controlled to emit frequency sweep signals with a frequency varying with time according to a predetermined law. This variation is generally linear or logarithmic. Typically, the frequency is varied within a range from 10 to 80 Hz over a time length of about 30 seconds.

The signals recorded by geophones are composite signals having components from different sources. A processing stage for the data received then makes it possible to separate the signal components from each source.

According to the slip-sweep acquisition technique, two sources, located in different places, are controlled to emit sweep signals simultaneously. The emitted sweep signals are orthogonal to each other. They sweep a frequency band, one in the increasing direction and the other in the decreasing direction, such that their instantaneous frequencies are never the same.

It is considered that two sweep signals $g_n$ and $g_m$ corresponding to shots n and m are orthogonal to each other or do not overlap in time when they fulfil the condition:

$$\sum_f G_m(f)e^{-2j\pi f t_m} \cdot G_n(f)e^{-2j\pi f t_n} = 0 \quad [1]$$

that is to say:

$$\int_t g_m(t-t_m)g_n(t-t_n)dt=0 \quad [2]$$

where $t_n$ represents the start time of the nth shot, $g_n(t)$ is the amplitude of the sweep signal corresponding to the nth shot as a function of time, $G_n(f)$ is the Fourier transform of $g_n(t)$ in function of the frequency f.

The separation of the signals arriving from each source is produced by correlating the signals recorded by the geophones with the sweep signals emitted by the sources. With the slip-sweep acquisition technique, the separation of signals recorded by correlation is only possible because the sweep signals emitted by the sources are orthogonal to each other.

Other acquisition techniques making it possible to take measurements by activating several sources simultaneously have been proposed.

Document US 6 545 944-B2 (published on Apr. 8, 2003) describes a process for acquiring seismic data in which sources emit long signals simultaneously. With this method, each source is composed of a plurality of emitter elements. The emitter elements of each of the sources are activated according to a predetermined activation sequence such that the source emits vibrations presenting a polarity varying with time. The activation sequences of different sources are distinct from each other and are chosen so that the recorded energy from each source can be separated from the recorded energy arriving from other sources.

The invention is aimed at a seismic exploration method using several sources under optimum efficiency conditions.

According to a first aspect, the invention relates to a method for seismic exploration, comprising the steps of:
  controlling a plurality of sources so that they emit a plurality of seismic waves in a medium to be explored, each source successively occupying a plurality of emitter positions;
  producing for each emission a signal representative of the emission, and recording the position of the source and the instant of the start of emission;
  continuously recording by means of seismic sensors the composite signals reflected by the medium in response to said emissions, and carrying out shot point migration t, on the one hand, from a reflected wave field constituted of said composite signals and respective sensor positions, and on the other hand, from an incident wave field constituted of signals representative of emissions, source positions and start emission instants, so as to obtain a seismic image.

The invention is applicable in the case of vibroseismic sources and of impulse sources.

In the case of vibroseismic signals, the migration stage is carried out by synthesizing an incident wave reconstituting, from information provided at the time of acquisition, the wave effectively emitted in the medium to be imaged, and not a correlated signal. The incident wave is thus composed of a plurality of superposed vibroseismic signals and is not presented in the form of a time and space impulse.

According to such a method, it can be understood that the existence of interferences between shots, represented by non-orthogonal vibroseismic signals, does not have excessive consequences on the finally obtained image of the subsurface zone being explored. In fact, since the vibroseismic signals are generated by sources arranged in different positions, they do not necessarily interfere, even though they are emitted with the same frequency at the same moment in time.

According to one embodiment of the invention, the method further comprises a deconvolution stage related to at least a part of the points of the zone being explored.

According to another aspect, the invention relates to method for the acquisition of seismic data, comprising the steps of:

controlling a plurality of sources so that they emit a plurality of seismic waves in a subsurface zone to be explored, each source successively occupying a plurality of emission positions, producing, for each emission, a signal representative of the emission and recording the position of the source and the start time of the emission, continuously recording, by means of seismic sensors, the composite signals reflected by the subsurface zone in response to said emissions and the positions of the sensors, the emission being exempt from any condition aimed at separating the contributions of the different sources in the composite signals.

According to another aspect, the invention relates to a data processing method for forming a seismic image of a subsurface zone, comprising the step of carrying out a shot point migration from:

on the one hand, a plurality of signals representative of seismic wave emissions in said zone, source positions and emission start times associated with each emission.

and on the other hand, composite signals reflected by the subsurface zone in response to said emissions and recorded continuously by the seismic sensors, and the sensor positions.

Other characteristics and advantages of the invention will be clear from the following description, said description being purely illustrative and non-limiting.

The first described embodiment relates to 3D land seismics.

It relates to a seismic data acquisition system comprising a plurality of vibroseismic sources and a plurality of cables each comprising a plurality of geophones spaced from each other and connected to a recording system.

In the conventional way, the cables are arranged along straight parallel lines. They can be ten or several tens in number.

The vibroseismic sources are constituted of so-called reaction masses carried by vehicles named vibrators. The vibroseismic signal is obtained by applying a force between this mass and a plate resting on the ground. According to the conventional method, the vibrators move between two shots perpendicularly to the direction of the cables, but it is also possible to envisage displacements parallel to the cables or in any direction whatsoever and different between vibrators.

The vibroseismic sources are controlled so as to generate a series of N shots during an acquisition session. At each shot, the vibroseismic source is activated to emit a sweep signal into the subsurface.

Each emitted vibroseismic signal is recorded using appropriate means provided on the vibrator, or alternatively, is estimated as a function of the definition parameters of the vibroseismic signal, the characteristics of the vibrator and appropriate measurements being taken at the time of each shot by means of sensors provided on the vibrator. Such means are known to those skilled in the art and do not need to be described in detail. Furthermore, means are provided to determine the position of the source for each shot and the instant the emission starts for each shot. In a way known to those skilled in the art, these means comprise a GPS device provided on the vibrator. The GPS device provides, apart from the position co-ordinates, an absolute origin-time, whereby instants at which the emission starts can be determined with precision. A typical precision is 80 microseconds. Means are further provided on the vibrator to record these data for each shot.

The recording is performed in a continuous mode during the acquisition session. The recording system comprises a clock system like that provided by a GPS device, so as to provide a precise origin-time for each of the signals produced by the sensors.

The positions of the geophones are determined by known methods, such as using a series of GPS elements implanted in appropriate locations.

The following notations are used:

$x_n$, $y_n$ designate the abscissa and ordinate co-ordinates at the surface of the ground (at depth z=0) for the source have emitted the nth shot, n being comprised between 1 and N, $t_n$ designates the start time of the nth shot, $g_n(t)$ is the amplitude of the sweep signal corresponding to the nth shot as a function of time.

Each signal recorded by one of the geophones during an acquisition session is a composite signal in which a plurality of vibroseismic components corresponding respectively to the vibroseismic signals generated by the different sources are added. When the sources are controlled to emit identical sweep signals $g_n(t)$ that are simultaneous or overlapping in time, the signal recorded by a geophone is a continuous signal that can last for several tens of minutes.

In a shot point migration processing, the signals recorded by the geophones are migrated from an incident wave and a reflected wave. The following description relates to depth shot point migration, but a time shot point migration can also be used.

The incident wave field i is reconstructed from information relative to the source positions, to the vibroseismic signals emitted by each source and to the emission start time of the vibroseismic signals. The incident wave field i(x,y,z,t,m) at the surface of the ground (that is at depth z=0) taken into account for the shot point migration is defined in the following manner:

$$i(x, y, z = 0, t) = \sum_{n=1}^{N} i_n(x, y, z = 0, t) \quad [5]$$

with $$i_n(x,y,z=0,t) = \delta(x-x_n, y-y_n)g_n(t-t_n) \quad [6]$$

where δ is the Kronecker function, which is equal to 0 if $x \neq x_n$ or $y \neq y_n$ and equal to 1 if $x = x_n$ and $y = y_n$.

By expressing the equation of the incident wave field in the Fourier domain, one obtains:

$$I(x, y, z = 0, f) = \sum_{n=1}^{N} \delta(x - x_n, y - y_n)G_n(f)e^{-2j\pi f t_n} \quad [7]$$

where I is the Fourier transform of the incident wave i, $G_n$ is the Fourier transform of the sweep signal $g_n$ and f is the frequency.

In the same way, the reflected wave field s(x,y,t) taken into account for the shot point migration is composed of the group of composite signals recorded by the geophones. The reflected wave field s is reconstructed from information related to the positions of the geophones, and to the signals recorded by each geophone. The Fourier transform of the reflected wave field equation is named S(x,y,f).

Shot point migration is a well known method and is documented in the literature. It consists of determining, on the basis of a pre-established velocity model, the reflectivity r(x,y,z) at subsurface points of co-ordinates (x,y,z). In the Fourier domain, the reflectivity R is expressed in the following way:

$$R(x, y, z) = \sum_f \overline{I(x, y, z, f)} S(x, y, z, f) \quad [8]$$

where $\overline{I(x,y,z,f)}$ is the conjugate of the Fourier transform of the incident wave field i, S(x,y,z,f) is the Fourier transform of the reflected wave field s, and f is the frequency.

It can be noted that the calculation of the reflectivity r, produces a correlation of the composite signals by the sweep signals emitted by the vibroseismic sources.

According to an embodiment, a local deconvolution operation is applied to the reflectivity resulting from the shot point migration. This operation can apply to the totality of the points of co-ordinates (x,y,z) or on selected regions in which deconvolution seems to be desirable.

To this effect, one can calculate the local autocorrelation matrices $M_{x,y,z}(\Delta x, \Delta y, \Delta z)$ as:

$$M_{x,y,z}(\Delta x, \Delta y, \Delta z) = \sum_f \overline{I(x+\Delta x, y+\Delta y, z+\Delta z, f)} I(x, y, z, f) \quad [11]$$

The matrices $M_{x,y,z}$ are next used for deconvolution of the reflectivity R(x,y,z) calculated before, locally and in three dimensions. This non-stationary deconvolution can, for example, take the form of the calculation of deconvolution of reflectivity $R_d(x,y,z)$ by resolution of the linear system:

$$\sum_{\Delta x, \Delta y \Delta z} M_{x,y,z}(\Delta x, \Delta y, \Delta z) R_d(x-\Delta x, y-\Delta y, z-\Delta z) = R(x, y, z)$$

The method as described above is applicable to vibroseismic signals that can overlap in time and which are not necessarily orthogonal or successive (in other words, they do not necessarily confirm equations [1] and [2]. The fact that the vibroseismic signals can be emitted without the emission being subject to conditions of orthogonality or, more generally, to conditions aimed at separating the contributions from the sources in the composite signals makes it possible to optimise the acquisition from an operational standpoint, and in particular to reduce the time required. In particular, it is possible to mobilise a large number of sources, for example up to 20 vibrators, and to control the shots without synchronisation conditions. Furthermore, each vibrator can thus constitute an independent source, contrary to prior art techniques in which each source is in fact constituted of several associated vibrators.

The "instructions" given to the sources to control their sweeps, that is, the rules for frequency variation as a function of time, can be the same for all the vibrators, but they can also be different. Such a variation has no harmful effect as long as the emitted vibroseismic signals are recorded, or alternatively, determined for each shot.

Considering distances between sources, it is appropriate to respect a minimum distance, so that the contributions from the sources in the composite signal supply effectively different information about the subs. For example, such a minimum distance can be of the order of 10 to 20 meters. Inversely, the distance between sources is limited for operational reasons: in practice it is more efficient to carry out acquisition with sources located in a relatively concentrated zone. While this is not to be considered as a limitation of the invention, it is deemed appropriate for the distance between sources to be up to a length of the order of a kilometer.

When the acquisition session is terminated, the cables are moved to other positions and another series of shots is carried out, and so on in the same way until the totality of the zone to be explored has been covered.

A shot point migration is carried out for each of the acquisition sessions. The results of each migration are then combined according to an appropriate method, such as stacking, to obtain an overall seismic image.

Another embodiment relates to 3D marine seismics. In this case, a seismic vessel tows a plurality of seismic streamers, for example 6 or more, each comprising a large number of hydrophones spaced out regularly. Means known to those skilled in the art are provided to maintain the seismic streamers as parallel as possible relative to each other. Seismic sources are towed by vessels called source vessels. Each source is typically formed by an array of air guns. For example, in order to obtain a wide range of acquisition azimuths (i.e. the azimuths of each of the source-receiver pairs), two source vessels can be provided, moving in the same direction as the streamers, one at the level of the seismic vessel, and the other behind the tail of seismic streamers, at a suitable lateral distance.

GPS means provided on the vessels and on the tail buoys of the seismic streamers supply the positions of the hydrophones, with the back-up of acoustic sensors placed along the seismic streamers, the source positions together and the origin times respectively for the shots and the recording, with the appropriate precision.

Means are provided for estimating the signals emitted by the sources. Techniques known to those skilled in the art, such as determination of the farfield signature, make it possible to make an estimation of the signals actually emitted in the direction of the subsurface zone to be explored. The usual technique for sources constituted of air guns consists in defining the emission characteristics of the air guns and timing them in such a way as to obtain an overall emission of the source the closest possible to a Dirac impulse function. The source position is then defined as the barycentre of the air guns. Within the scope of the invention, it is also possible to envisage using air guns each operating as an independent source, without timing condition. The positions are then defined individually for each of the air guns.

Each of the air guns is operated in the appropriate way at irregular time intervals, controlled by a random sequence, so as to avoid the correlations resulting from a fixed time interval between shots.

The seismic streamers are connected to a recording system mounted on the vessel. Recording is carried out continuous.

Shot point migration can be carried out as described above for the embodiment concerning land seismics. A migration is carried out for each acquisition session corresponding to a displacement of the seismic streamers along a straight line. After the vessel towing the seismic streamer has made a turn, another acquisition session is carried out, and so on. A shot point migration is carried out separately for each acquisition session, and then the results of the different migrations are combined as described above.

Instead of pulse sources like air guns, one can envisage using vibrator type marine sources.

The invention claimed is:

1. A method for seismic exploration, comprising the steps of:
controlling a plurality of sources so that they emit a plurality of seismic waves in a subsurface zone to be explored, each source successively occupying a plurality of emitter positions;
producing for each emission an emission signal, and recording the position of the source and the instant of the start of the emission;
recording, by seismic sensors, composite signals reflected by the subsurface zone in response to said emissions; and
carrying out a shot point migration from a reflected wave field reconstructed from the composite signals and the respective positions of the sensors, and an incident wave field reconstructed from the emission signals, the source positions and the instants of start of emission, to obtain a seismic image, wherein the shot point migration uses a product of a Fourier transform of the reflected wave field and a conjugate of a Fourier transform of the incident wave field to determine a reflectivity r associated with the subsurface zone.

2. The method according to claim 1, further comprising a step of local deconvolution concerning at least a part of the points of the subsurface zone, the step of deconvolution comprising determining a deconvolved reflectivity r' in the part of the points, the deconvolved reflectivity being obtained by calculating the local autocorrelation matrices from:

$$M_{x,y,z}(\Delta x, \Delta y, \Delta z) = \sum_f \overline{I(x, y, z, f)} I(x - \Delta x, y - \Delta y, z - \Delta z, f)$$

and then by solving the linear systems from:

$$\sum_{\Delta x, \Delta y \Delta z} M_{x,y,z}(\Delta x, \Delta y, \Delta z) r'(x - \Delta x, y - \Delta y, z - \Delta z,) = r(x, y, z)$$

where $I(x,y,z,f)$ is a Fourier transform of the incident wave i, $\overline{I(x,y,z,f)}$ is a conjugate of $I(x,y,z,f)$, and f is a frequency.

3. The method according to claim 1, adapted to land seismics, wherein the sources are vibrators and the sensors are geophones.

4. The method according to claim 1, adapted to marine seismics, wherein the sources are impulse sources and the sensors are hydrophones.

5. The method according to claim 4, wherein the sources comprise at least one air gun operated at instants determined by a random sequence.

6. A method for processing data for forming a seismic image of a subsurface zone, comprising the step of:
carrying out a shot point migration from:
an incident wave field reconstructed from emission signals, source positions and emission start instants associated with each emission, and
a reflected wave field reconstructed from composite signals reflected by the subsurface zone in response to the emissions recorded by seismic sensors, and sensor positions, wherein the shot point migration uses a product of a Fourier transform of the reflected wave field and a conjugate of a Fourier transform of the incident wave field to determine a reflectivity r associated with the subsurface zone.

7. The method according to claim 6, comprising a step of local deconvolution concerning at least part of the points of the subsurface zone comprising determining a deconvolved reflectivity r' in the part of the points, the deconvolved reflectivity being obtained by calculating the local autocorrelation matrices from:

$$M_{x,y,z}(\Delta x, \Delta y, \Delta z) = \sum_f \overline{I(x, y, z, f)} I(x - \Delta x, y - \Delta y, z - \Delta z, f)$$

and then solving the linear systems from:

$$\sum_{\Delta x, \Delta y \Delta z} M_{x,y,z}(\Delta x, \Delta y, \Delta z) r'(x - \Delta x, y - \Delta y, z - \Delta z,) = r(x, y, z)$$

where $I(x,y,z,f)$ is a Fourier transform of an incident wave i, $\overline{I(x,y,z,f)}$ is a conjugate of $I(x,y,z,f)$, and f is a frequency.

8. A method for the acquisition of seismic data, comprising the steps of:
controlling a plurality of sources so that they emit a plurality of seismic waves in a subsurface zone to be explored, each source successively occupying a plurality of emitter positions;
producing, for each emission, an emission signal, and recording the position of the source and the instant of the start of emission;
recording, by seismic sensors, composite signals reflected by the subsurface zone in response to said emissions and the sensor positions;
the emission being exempt from conditions intended to separate the contributions from different sources in the composite signals; and
determining a reflectivity r associated with the subsurface zone, wherein the reflectivity is given by a product of a Fourier transform of a reflected wave field and a conjugate of a Fourier transform of an incident wave field, wherein the incident wave field is reconstructed emission and emission start instants associated with each emission, and the reflected wave field is reconstructed from the composite signals reflected by the subsurface zone in response to the emissions, and the sensors positions.

9. The method according to claim 8, wherein the distances between sources comprise between 10 meters and about 1 kilometer.

10. The method for acquisition according to claim 8, wherein the sources are vibrators and the sensors are geophones.

11. The method for acquisition according to claim 8, wherein the sources are impulse sources and the sensors are hydrophones.

12. The method according to claim 11, wherein the sources comprise of at least one air gun operated at instants determined by a random sequence.

13. The method according to claim 11, wherein the sources comprise a plurality of air guns operated independently from each other.

14. The method according to claim 1, wherein the incident wave field is composed of a plurality of superposed signals corresponding to the plurality of sources.

15. The method of claim 1, wherein the plurality of sources is configured to emit non-orthogonal signals that interfere among them.

16. The method of claim 1, wherein each composite signal recorded by the seismic sensors includes a sum of signals from the plurality of sources.

17. The method according to claim 6, wherein the incident wave field is composed of a plurality of superposed signals corresponding to the plurality of sources.

18. The method of claim 6, wherein the plurality of sources is configured to emit non-orthogonal signals that interfere among them.

19. The method of claim 6, wherein each composite signal recorded by the seismic sensors includes a sum of signals from the plurality of sources.

20. The method according to claim 8, wherein the incident wave field is composed of a plurality of superposed signals corresponding to the plurality of sources.

* * * * *

UNITED STATES PATENT AND TRADEMARK OFFICE
CERTIFICATE OF CORRECTION

PATENT NO. : 8,014,229 B2
APPLICATION NO. : 11/659994
DATED : September 6, 2011
INVENTOR(S) : Meunier et al.

It is certified that error appears in the above-identified patent and that said Letters Patent is hereby corrected as shown below:

In Column 1, Line 18, delete "reflected," and insert -- reflected --, therefor.

In Column 5, Line 46, in Equation, delete " $\sum_{\Delta x, \Delta y \Delta z}$ " and insert -- $\sum_{\Delta x, \Delta y \Delta z}$ --, therefor.

In Column 7, Line 47, in Claim 2, in Equation, delete " $\sum_{\Delta x, \Delta y \Delta z}$ " and insert -- $\sum_{\Delta x, \Delta y \Delta z}$ --, therefor In Column 8, Line 25, in Claim 7, in Equation, delete " $\sum_{\Delta x, \Delta y \Delta z}$ " and insert -- $\sum_{\Delta x, \Delta y \Delta z}$ --, therefor.

In Column 8, Line 50, in Claim 8, delete "reconstructed emission" and insert -- reconstructed from emission signals --, therefor.

In Column 8, Line 66, in Claim 12, delete "comprise of" and insert -- comprise --, therefor.

Signed and Sealed this
Sixth Day of March, 2012

David J. Kappos
*Director of the United States Patent and Trademark Office*